Loftie & Hinman,
Rock Drill.

Nº 51,065.    Patented Nov. 21, 1865.

Witnesses:
W. M. Brown
L. F. Smith

Inventor:
Henry Loftie
Egbert Hinman

UNITED STATES PATENT OFFICE.

HENRY LOFTIE AND EGBERT HINMAN, OF SYRACUSE, NEW YORK.

IMPROVED DRILL.

Specification forming part of Letters Patent No. 51,065, dated November 21, 1865.

*To all whom it may concern:*

Be it known that we, HENRY LOFTIE and EGBERT HINMAN, of the city of Syracuse, in the county of Onondaga and State of New York, have invented a new and useful Improved Combination-Drill; and we do hereby declare that the following is a full, clear, and exact description of the construction and operation of the same, reference being had to the annexed drawings, making a part of this specification.

Figure 1:
Figure 2:
Figure 3:
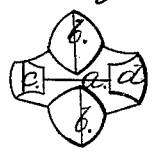

Figures 1 and 2, side views; Fig. 3, end view.

Letter $a$ is the leading point of the combination-drill, extending below the other parts of the drill far enough so as to act as a guide to the drill.

Letters $b\ b$ are two drills, situated at right angles to said drill $a$, placed central and at opposite sides of said drill $a$. Letter $c$ is a drill at right angles with drill $a$ and parallel with drills $b\ b$.

Letter $d$ is a reamer parallel with the drills $b\ b$, the outside forming a portion of the circle of the diameter of the combination-drills, the face of it being beveled from the extreme outside face, and may or may not extend to the same point as the drills $a\ b\ b\ c$. The points of drills $b\ b\ c$ all are placed at an equal distance from the point of the drill $a$, and the reamer $d$ may or may not be placed at the same equal distance from the point of drill $a$, all of said drills $a\ b\ b\ c$ and reamer $d$ being formed and made of and in one block of steel.

We construct our combination-drill out of a piece or block of steel, forming the drills $a\ b\ b\ c$ and reamer $d$ of said piece or block of steel in the form and manner above described and in accordance with the drawings hereto annexed.

The operation of our combination-drill is as follows: The center drill, $a$, is intended to start and guide the drills $b\ b\ c$ and reamer $d$. The drill $c$, being parallel with the drills $b\ b$, as the combination-drill is rotated cuts at right angles with drills $b\ b$, and thereby cuts away the stone or material in which it is used with increased rapidity. The reamer $d$ is held in its proper place by drills $a\ b\ b\ c$, and as the whole is rotated finishes the inside surface, thereby making a true and perfectly round hole as fast as the combination-drill is forced down into the stone by whatever motive power may be applied for that purpose.

What we claim as new, and desire to secure by Letters Patent, is—

The cutters $a$ and $b$, in combination with reamer $d$ and cutter $c$, arranged in relation to each other, substantially as described.

HENRY LOFTIE.
    EGBERT HINMAN.

Witnesses:
 W. M. BROWN,
 L. F. SMITH.